United States Patent
Gunness

(10) Patent No.: US 11,224,209 B1
(45) Date of Patent: Jan. 18, 2022

(54) SNAG-FREE FISH HOOK ASSEMBLY, KIT, AND METHOD

(71) Applicant: Clark Robert Gunness, Nashville, TN (US)

(72) Inventor: Clark Robert Gunness, Nashville, TN (US)

(*) Notice: Subject to any disclaimer, the term of this patent is extended or adjusted under 35 U.S.C. 154(b) by 0 days.

(21) Appl. No.: 17/180,891

(22) Filed: Feb. 22, 2021

(51) Int. Cl.
*A01K 83/00* (2006.01)
*A01K 85/02* (2006.01)

(52) U.S. Cl.
CPC .............. *A01K 83/00* (2013.01); *A01K 85/02* (2013.01)

(58) Field of Classification Search
CPC ......... A01K 85/02; A01K 85/00; A01K 83/00
USPC .. 43/42.39, 42.4, 42.41, 42.42, 42.43, 44.81
See application file for complete search history.

(56) References Cited

U.S. PATENT DOCUMENTS

| | | | | | |
|---|---|---|---|---|---|
| 524,928 | A | * | 8/1894 | Bacon | A01K 83/06 43/41 |
| 745,066 | A | * | 11/1903 | Koch | A01K 85/00 43/44.81 |
| 1,067,178 | A | * | 7/1913 | Lambert | A01K 85/14 43/42.34 |
| 2,576,795 | A | * | 11/1951 | Lane | A01K 85/02 43/42.42 |
| 2,866,293 | A | * | 12/1958 | Dedrick | A01K 85/00 43/43.13 |
| 2,912,784 | A | * | 11/1959 | Carlin | A01K 85/00 43/42.17 |
| 3,078,611 | A | * | 2/1963 | Nishioka | A01K 85/08 43/42.05 |
| 3,079,723 | A | * | 3/1963 | Roes | A01K 85/00 43/42.26 |
| 3,110,979 | A | * | 11/1963 | Woodley | A01K 85/00 43/42.74 |
| 3,191,336 | A | * | 6/1965 | Cordell, Jr. | A01K 85/00 43/42.24 |
| 3,245,171 | A | * | 4/1966 | Henry | A01K 85/00 43/42.1 |
| 3,343,296 | A | * | 9/1967 | Herschel | A01K 85/00 43/42.28 |
| 3,750,321 | A | * | 8/1973 | McClellan | A01K 85/00 43/42.1 |
| 4,450,646 | A | * | 5/1984 | Maltese | A01K 95/00 43/43.14 |
| 4,530,180 | A | * | 7/1985 | Gwaldacz, Sr | A01K 85/00 43/42.28 |

(Continued)

FOREIGN PATENT DOCUMENTS

| | | | | | |
|---|---|---|---|---|---|
| FR | 937342 | A | * | 8/1948 | ............. A01K 85/02 |
| FR | 2097350 | A5 | * | 3/1972 | ............. A01K 85/10 |

(Continued)

OTHER PUBLICATIONS

Translation of KR 10-1445486 (Year: 2014).*
Translation of FR 2845565 (Year: 2004).*
Translation of KR 10-2007-0009933 (Year: 2007).*

*Primary Examiner* — Darren W Ark
(74) *Attorney, Agent, or Firm* — Catherine Napjus; Michael Persson; Chisholm, Persson & Ball, PC

(57) ABSTRACT

A fish hook assembly that includes a rounded bead affixed in the notch between the eye of the hook and an intermediary object, such as a weed guard, fish attractor component, weighted head, or bend. Underwater obstructions that would normally get snagged in the notch will roll away over the bead.

7 Claims, 4 Drawing Sheets

(56) References Cited

U.S. PATENT DOCUMENTS

| | | | | |
|---|---|---|---|---|
| 4,596,086 A * | 6/1986 | Garland | A01K 85/00 | 43/42.4 |
| 4,747,228 A * | 5/1988 | Giovengo, Jr. | A01K 85/01 | 43/42.31 |
| 4,777,758 A * | 10/1988 | Phillips | A01K 85/00 | 43/42.09 |
| 4,796,378 A * | 1/1989 | Krueger | A01K 83/00 | 43/42.38 |
| 4,864,766 A * | 9/1989 | Bohn | A01K 85/00 | 43/42.37 |
| 4,888,909 A * | 12/1989 | Adams | A01K 85/10 | 43/42.16 |
| 4,893,430 A * | 1/1990 | Barfield | A01K 85/00 | 43/42.24 |
| 4,926,579 A * | 5/1990 | Jimenez | A01K 85/00 | 43/42.44 |
| 5,203,105 A * | 4/1993 | Bond | A01K 85/00 | 43/42.28 |
| 5,335,443 A * | 8/1994 | Grigsby, Jr. | A01K 85/00 | 43/43.14 |
| 5,388,367 A * | 2/1995 | Rydell | A01K 83/00 | 43/42.1 |
| 5,491,927 A * | 2/1996 | Ortiz | A01K 85/00 | 43/42.28 |
| 5,551,185 A * | 9/1996 | Reed | A01K 85/00 | 43/42.31 |
| 5,673,508 A * | 10/1997 | Snyder | A01K 83/00 | 43/42.37 |
| 5,822,914 A * | 10/1998 | Tadych | A01K 85/02 | 43/42.39 |
| 5,890,317 A * | 4/1999 | Hollomon | A01K 83/06 | 43/44.8 |
| 6,122,855 A * | 9/2000 | Heuke | A01K 85/00 | 43/42.09 |
| 6,772,553 B2 * | 8/2004 | Phillips | A01K 85/02 | 43/42.11 |
| 6,898,894 B1 * | 5/2005 | Anderson | A01K 85/00 | 43/42.39 |
| 7,614,178 B2 * | 11/2009 | Hoyt | A01K 85/01 | 43/42.31 |
| 7,748,157 B1 * | 7/2010 | Hellmann | A01K 85/00 | 43/42.39 |
| 8,458,950 B2 * | 6/2013 | Mayer | A01K 85/00 | 43/42.32 |
| 9,010,015 B2 * | 4/2015 | Lorentz | A01K 85/00 | 43/42.39 |
| 9,185,891 B2 * | 11/2015 | Nakamichi | A01K 83/00 | |
| 9,253,966 B2 * | 2/2016 | Scholfield | A01K 85/01 | |
| 9,456,592 B1 * | 10/2016 | Payer | A01K 85/02 | |
| 9,814,221 B2 * | 11/2017 | Merritt | A01K 95/00 | |
| 9,936,681 B2 * | 4/2018 | Mancini | A01K 85/00 | |
| 10,123,520 B2 * | 11/2018 | Furuya | A01K 95/00 | |
| 2003/0145507 A1 * | 8/2003 | Claverie | A01K 85/00 | 43/4.5 |
| 2005/0132634 A1 * | 6/2005 | Reed | A01K 85/00 | 43/44.81 |
| 2007/0044368 A1 * | 3/2007 | Duckett | A01K 85/08 | 43/42.25 |
| 2007/0271838 A1 * | 11/2007 | Lowiecki | A01K 85/02 | 43/42.39 |
| 2008/0148623 A1 * | 6/2008 | Uhrig | A01K 85/02 | 43/42.39 |
| 2008/0313948 A1 * | 12/2008 | Lewis | A01K 85/01 | 43/42.24 |
| 2009/0077859 A1 * | 3/2009 | Aylsworth | B22D 19/00 | 43/42.39 |
| 2009/0113783 A1 * | 5/2009 | Hollomon | A01K 85/00 | 43/42.31 |
| 2009/0211144 A1 * | 8/2009 | Murphy | A01K 85/00 | 43/42.19 |
| 2010/0229454 A1 * | 9/2010 | Cunningham | A01K 85/00 | 43/42.31 |
| 2010/0313463 A1 * | 12/2010 | Coxey | A01K 85/00 | 43/42.39 |
| 2010/0325938 A1 * | 12/2010 | Gillihan | A01K 83/06 | 43/44.4 |
| 2011/0296738 A1 * | 12/2011 | Howe | A01K 85/00 | 43/42.37 |
| 2012/0005946 A1 * | 1/2012 | Bennis | A01K 85/00 | 43/42.53 |
| 2012/0079757 A1 * | 4/2012 | Rye | A01K 85/01 | 43/42.09 |
| 2013/0180158 A1 * | 7/2013 | Butters | A01K 85/02 | 43/42.1 |
| 2014/0237889 A1 * | 8/2014 | Tamburro | A01K 85/00 | 43/42.09 |
| 2016/0235049 A1 * | 8/2016 | Thorne | A01K 85/14 | |
| 2017/0231207 A1 * | 8/2017 | Tarazona Sicilia | A01K 85/02 | 43/42.09 |
| 2018/0027786 A1 * | 2/2018 | Baggett | A01K 85/00 | |
| 2018/0168136 A1 * | 6/2018 | Sano | A01K 85/02 | |
| 2019/0104712 A1 * | 4/2019 | Longas Vacas | A01K 85/01 | |
| 2019/0133098 A1 * | 5/2019 | Lee | A01K 85/02 | |
| 2019/0269114 A1 * | 9/2019 | Biggs | A01K 85/16 | |
| 2021/0274761 A1 * | 9/2021 | Kim | A01K 85/02 | |

FOREIGN PATENT DOCUMENTS

| | | | | |
|---|---|---|---|---|
| FR | 2794939 A1 * | 12/2000 | | A01K 85/08 |
| FR | 2845565 A1 * | 4/2004 | | A01K 83/06 |
| FR | 2926188 A1 * | 7/2009 | | A01K 85/00 |
| GB | 1021663 A * | 3/1966 | | A01K 85/02 |
| JP | 03272633 A * | 12/1991 | | |
| JP | 2003079275 A * | 3/2003 | | |
| JP | 2006191821 A * | 7/2006 | | |
| JP | 2017000081 A * | 1/2017 | | |
| JP | 2019088264 A * | 6/2019 | | |
| KR | 20070006212 A * | 1/2007 | | |
| KR | 20070009933 A * | 1/2007 | | |
| KR | 100702172 B1 * | 3/2007 | | |
| KR | 100760354 B1 * | 10/2007 | | |
| KR | 100760356 B1 * | 10/2007 | | |
| KR | 100789163 B1 * | 12/2007 | | |
| KR | 101242178 B1 * | 3/2013 | | |
| KR | 101445486 B1 * | 9/2014 | | |
| WO | WO-2005022990 A1 * | 3/2005 | | A01K 85/02 |
| WO | WO-2017070118 A1 * | 4/2017 | | A01K 97/05 |
| WO | WO-2017142246 A1 * | 8/2017 | | A01K 85/02 |

* cited by examiner

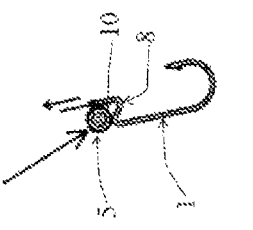
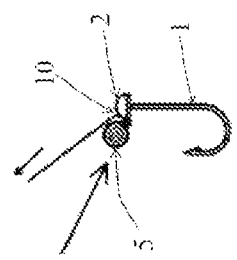
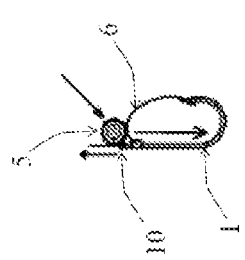
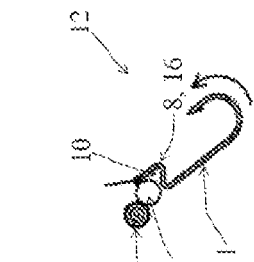
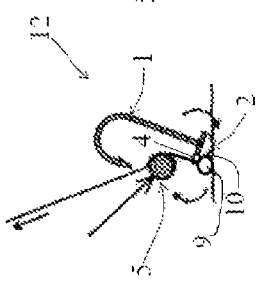
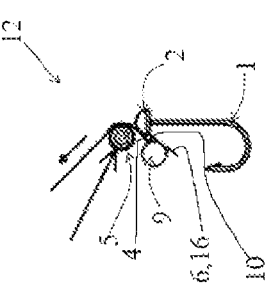
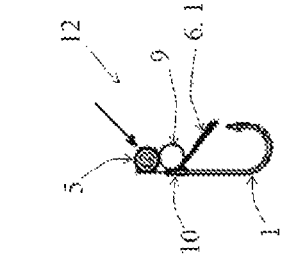
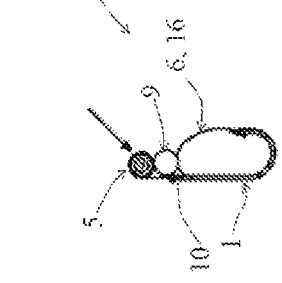
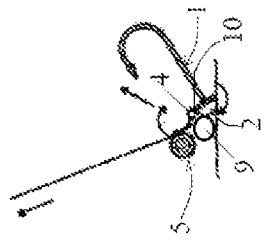
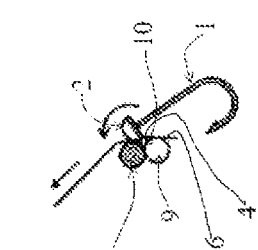
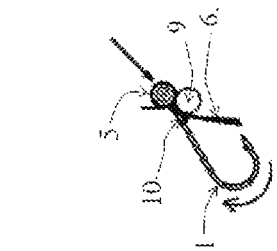
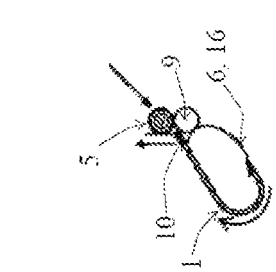

SNAG-FREE FISH HOOK ASSEMBLY, KIT, AND METHOD

FIELD OF THE INVENTION

The present invention relates generally to fishing gear, and specifically, to a fish hook assembly that will avoid snagging.

BACKGROUND

Fishing has been a practical and enjoyable hobby since time immemorial. Getting weeds and other detritus caught on one's hook has been an irritation also associated with fishing since time immemorial. A basic hook assembly includes a curved hook with a straight shank that ends in an eye through which a fishing line may be attached. Many hook assemblies include a weed guard extending generally from near the eye toward the barb of the hook. One common weed guard includes one or more fairly rigid spikes extending downward from near the eye toward the hook. This type of weed guard is referred to herein as a "flat weed guard." Another common weed guard includes a curved connector extending between the eye area and the end of the hook, where the connector may easily be depressed inward toward the shank of the hook if a fish were to bite. This type of weed guard is referred to herein as a "curved weed guard." Although weed guards do prevent some tangling, especially on the hook itself, a hook with a weed guard will not work well with fishing for certain types of fish or in certain conditions. Weed guards also do not prevent all tangles with the various detritus at or below the water's surface.

Referring to FIGS. 1a and 2a, side views of prior art hook assemblies with weed guards 6 are provided. Each has hook 1, ending in eye 4 through which fishing line 3 is attached. In FIG. 1a, weed guard 6 is a flat weed guard. In FIG. 2a, weed guard 6 is a curved weed guard. A notch 10 is formed between eye 4 and weed guard 6. Hook 1 has hook end 30 and eye end 32.

Now referring to FIG. 3a, a side view of a hook assembly with weighted head 2 is provided. A notch 10 is also formed in this embodiment between eye 4, weighted head 2, and line 3. In some embodiments, the eye 4 is incorporated into the weighted head 2, so that the notch 10 is between line 3 and the combined weighted head 2/eye 4. Weighted heads 2 are used to affect the descent rate of a hook assembly. While having a heavier assembly may be desirable to provide a downward, head-down descent through the water column and on the bottom of the water body, there is also a desire for a slow descent and some movement of the bait to more realistically imitate what would naturally attract a fish and a weighted head detracts from these aspects. Weighted heads 2 therefore have advantages and disadvantages.

Now referring to FIG. 4a, a side view of a hook assembly with an offset bend 8 is provided. Bend 8 is simply an extra "s" or "z" shaped jog between the shank of hook 1 and eye 4. A notch 10 is also formed near eye 4 in this embodiment by the very nature of bend 8.

As discussed above, weed guards do prevent some weeds from getting caught in the curvature of the hook. Not all hook assemblies include weed guards, though, and weed guards do not prevent all obstructions. Notch 10, as shown in FIGS. 1a, 2a, 3a, and 4a, is particularly prone to catching snags. Notch 10 can easily catch on sand, gravel, stone, woods, weeds, leaves, sticks, etc. This can and does cause the entire hook assembly to become stuck or snagged, making it difficult or impossible to retrieve the hook assembly or causing the fishing line to break off or part from the eye. The loss of the hook assembly is frustrating; costly; bad for the environment from a littering point of view; and potentially toxic to the environment depending on the materials used in the hook assembly.

FIGS. 1b and 2b provide side views of the prior art hook assemblies shown in FIGS. 1a and 1b, respectively, with obstructions 5 lodged in notches 10. FIGS. 3b and 3c provide side views of the prior art hook assembly shown in FIG. 3a, with obstructions 5 getting caught in notch 10 in different ways. FIG. 4b provides a side view of the prior art hook assembly shown in FIG. 4a, with obstruction 5 lodged in notch 10. Although obstructions 5 are depicted as a round ball, it is understood that obstructions 5 may be anything on which the hook assembly may snag underwater, such as sand, gravel, stone, wood, weeds, leaves, sticks, etc., so obstructions 5 are not likely to be neat, round balls in reality. One of ordinary skill in the art will recognize that there are many ways in which many underwater items may get snagged in the notches 10 of the various prior art hook assemblies.

Therefore there is a need for a hook assembly that prevents such snagging in such notches.

SUMMARY OF THE INVENTION

The present invention is a hook assembly, a hook assembly kit, and a method for preparing to fish. Although the present invention is directed toward the art of fishing, it is recognized that it may have applicability in other areas.

In its most basic form, the fish hook assembly of the present invention includes a hook with a hook end and an eye end; an eye disposed proximate to the eye end of the hook; an intermediary object disposed at the eye end of the hook such that a notch is formed between the intermediary object and the eye; and a round bead disposed in the notch.

The hook is preferably a standard curved hook with a barb at the hook end, that curves from the hook end in a generally "u" shape, and then extends straight through the shaft to the eye end of the hook. Any hook commonly used in the art of fishing may be used. The eye is at or right next to the eye end of the hook. The eye is a standard hole through which fishing line will be threaded so as to affix the fishing line to the hook. The intermediary object may be any commonly used in the art of fishing, such as, non-exclusively, a weed guard extending at least partially from the eye to the hook end of the hook, particularly either a flat or curved weed guard, as discussed above; a weighted head; a bend between the eye and the eye end of the hook, in which case the bend itself is the notch; and a fish attractor component. A fish attractor component may be, for example, a rubber worm. At least part of each of these possible intermediary objects is disposed right next to the eye so that a notch is formed between the intermediary object and the eye. As discussed above, this notch is a prime area for snags. The round bead that is affixed into the notch prevents such snags.

The round bead need not be perfectly round, but it preferably essentially round, that is to say, its surface may be round, oval, or teardrop-shaped, but may also be multi-faceted, like a convex dodecahedron, so that the shape is generally round but does have obtuse angles. The roundedness of the bead allows obstructions to simply roll off of, or be shed from, the surface of the bead in almost any direction, from any side and in any orientation of the hook. The round bead may also be hollow or solid and may be made of any solid material. Hollow beads may be filled with a very light gas to make them more buoyant. "Light gas" may be, for examples, air, oxygen, hydrogen, helium, etc., but generally should be less dense than air at 1 atm and 10° C. The bead may be affixed in the notch by any means commonly used in the art, such as adhesive, welding, tying, clipping, etc.

The eye of the hook assembly is at eye level. The bead is preferably disposed in the notch so that at least the top of the bead is at or above eye level. This will avoid snags in the eye itself. The bottom of the eye is the point on the eye that is closest to the eye end of the hook. For many hook assemblies, this will be the intersection of the eye and the eye end of the hook. The top of the eye is the point on the eye that is farthest away from the bottom of the eye. If there were a plane perpendicular to the shank of the hook (where the shank is straight), then eye level would be a parallel plane to that plane, where the eye level plane intersects the top of the eye. The bottom of the hook is the point on the hook farthest away from the eye. The bottom of the bead is the point on the bead closest to the bottom of the hook. The top of the bead is the point on the bead farthest away from the bottom of the bead. The top of the bead is preferably at or above eye level. In this context, "above" means in the direction of the fishing line if fishing line were threaded through the eye and the hook assembly were dangling from the fishing line in air.

In its most basic form, the fish hook assembly kit of the present invention is any of the fish hook assemblies of the present invention and fishing line of an appropriate thickness so that it can be threaded through the eye of the hook assembly. The kit may also include a fishing pole.

In its most basic form, the method for preparing to fish includes the following steps: determining a desired buoyancy of a fish hook assembly, where the fish hook assembly is any of the present invention, notably including a bead for affixation in the notch; determining a weight of the hook, the eye, and the weighted head of the fishing hook assembly; determining characteristics of a round bead that will effect the desired buoyancy when affixed to the notch; supplying a round bead with those characteristics; and affixing the supplied round bead to the notch of the fish hook assembly.

As discussed in the Background, how a hook assembly moves through the water is an important aspect of its utility and likelihood of successful fishing. In addition to weighted heads, a fisherman may use a heavier fishing line material for strength, but as with the weighted heads, this will affect the drop rate and action of that hook assembly. The action may also be affected by the buoyancy of any rubber bait attached to the hook assembly, which will tend to slow the descent of the assembly through the water column, and importantly through the strike zone where fish may be floating in a stationary fashion. It is generally thought that lighter assemblies will more realistically imitate the action of a natural target for a fish. Then again, there are also advantages, discussed above, to a heavier assembly. An option would be to use a large rubber bait whose buoyancy could offset the weight of the other components of the assembly, but larger rubber baits are not desirable because they are so prone to getting caught on underwater objects other than fish.

The answer lies in selecting the correct bead to include in the hook assembly of the present invention. As discussed above, the placement of the bead in the notch of the hook assembly will prevent many unwanted snags at the eye of the hook assembly. The characteristics of the bead itself can also address the issues of weight, buoyancy, and action of the hook assembly as a whole, however. The specific gravity of the material from which the bead is made can alter the descent rate and action characteristics of the assembly and its bait. A bead that has the right floatation characteristics could slow the rate of descent of an assembly with a weighted head and provide greater floating action at the bottom, while simultaneously providing protection to the eye from snags. The bead might also be nearly the same density as water and not affect the floating action of the hook assembly if that is desired.

There is yet another advantage to having the floatation of the bead offset the weight of the weighted head. When a hook assembly is thrown into cover (meaning the weeds and other matter on top of or near the surface of the water), the weight of the head and its momentum when being cast is what allows the hook to penetrate the cover and sink into the water column below the cover and to the bottom. Because it is desirable to have as much action as possible with the assembly, it makes sense to allow the bead to counteract the weight of the larger weights of the head once the assembly is through the cover and into the water column. Physics dictates that the weight of the head will determine the ability of the assembly to penetrate a cover because the momentum in the weight determines the preservation of the force needed to penetrate something. The momentum that generates the force with a hook assembly is concentrated in the head weight and the hook, and to some small extent in the worm. The weight of the bead also figures into the momentum equation, with the variable being the height and angle from which the assembly meets the water surface, and specifically the cover it is designed to penetrate. Once it penetrates the cover, however, which is usually the instant it contacts the cover and proceeds into the water column, the characteristics of the assembly change: the metal portions weigh less by the volume of water they displace, but the worm is already designed to be lighter than water, and the bead can now perform its intended function of clearing snags that might impede retrieval of the assembly and imparting more buoyancy to the assembly once it is through the cover and into the water column.

Applying these considerations to the method of the present invention, all of these factors contribute to the desired buoyancy of the fish hook assembly. As discussed above, it is desirable for the hook assembly to have sufficient weight, likely in the weighted head, for the hook assembly to move well through the water column. The specific gravity of the bead may allow for that weight while also counteracting the dropping motion with flotation characteristics that will slow the descent and provide realistic action. Even a small bead may counteract a large weight by its manufacturing characteristics, such as the material out of which it is made; whether it is hollow or solid; and if hollow, what gas fills the center. The desired buoyancy of the hook assembly will also depend on the water that is being fished. Salt water and fresh water have different densities, for example, which will require different hook assembly buoyancies for optimal performance. As such, when used herein the term "desired buoyancy" encompasses not just the hook assembly's overall density or mass per volume, but also the mass of its individual components, especially the weighted head and the bead, and how those weights may counteract one another; and possibly the density of the water being fished.

The first step in the method of the present invention is to determine this desired buoyancy. The second step is to determine the weight of the hook, the eye, and the weighted head, where it is understood that the weighted head is the main contributor to the sum of the weights of these components. Notably, a fisherman may be able to use a heavier weighted head than he would normally select, gaining the advantages of a heavier weight, knowing that the disadvantages will be offset by the bead's characteristics. The third step is to determine those bead characteristics that will effect the desired buoyancy. These bead characteristics may be the beads weight, specific gravity, and/or density, non-exclusively. Finally, a bead with those characteristics is sourced and affixed in place on the hook assembly.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIGS. 1a and 1b are side views of a prior art fish hook assembly with a flat weed guard.

FIGS. 1c and 1d are side views of a fish hook assembly of the present invention similar to the prior art fish hook assembly provided in FIGS. 1a and 1b.

FIGS. 2a and 2b are side views of a prior art fish hook assembly with a curved weed guard.

FIGS. 2c and 2d are side views of a fish hook assembly of the present invention similar to the prior art fish hook assembly provided in FIGS. 2a and 2b.

FIGS. 3a-3c are side views of a prior art fish hook assembly with a weighted head.

FIGS. 3d-3g are side views of a fish hook assembly of the present invention similar to the prior art fish hook assembly provided in FIGS. 3a-3c.

FIGS. 4a and 4b are side views of a prior art fish hook assembly with an offset bend.

FIG. 4c is a side view of a fish hook assembly of the present invention similar to the prior art fish hook assembly provided in FIGS. 4a and 4b.

DETAILED DESCRIPTION

Figure 1A:
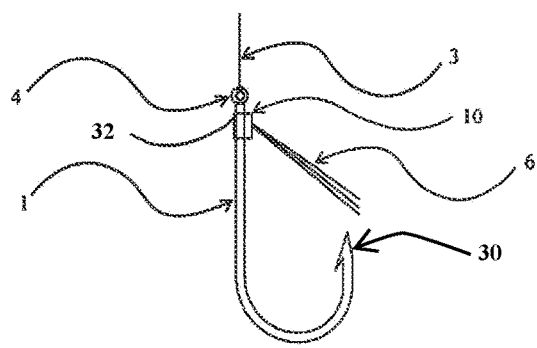
Figure 2A:
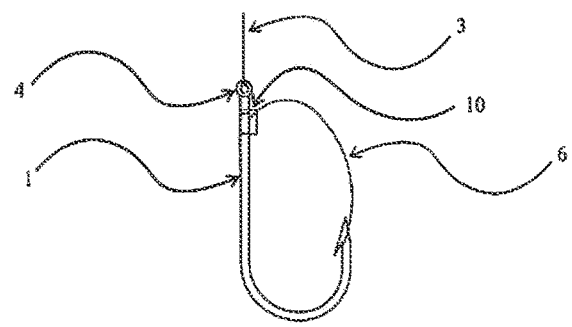

Now referring to FIGS. 1c and 2c, side views of hook assembly 12 of the present invention are provided. Like the prior art assemblies shown in FIGS. 1a and 2a, the hook assemblies 12 shown in FIGS. 1c and 2c have intermediary objects 16 that are weed guards 6. Unlike the prior art assemblies, however, the hook assemblies 12 of the present invention also include bead 9 disposed in notch 10. Instead of becoming lodged in notch 10, as shown in FIGS. 1b and 2b, obstructions 5 are prevented from entering notch 10 by the presence of bead 9. As shown in FIGS. 1d and 2d, the obstructions 5 are simply shed off of or roll off of bead 9.

Figure 3A:
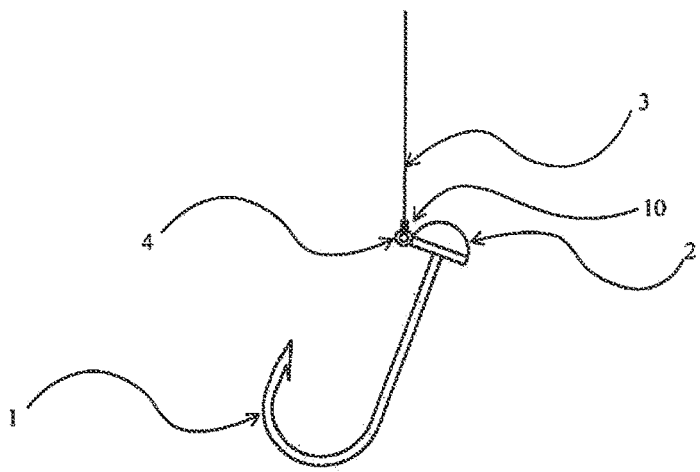

FIGS. 3d-3g disclose hook assemblies 12 with an intermediary object 16 that is weighted head 2 or a weed guard 6. In FIGS. 3d and 3e, eye end 32 includes a weighted head 2, but weed guard 6 is intermediary object 16. These embodiments are similar to the prior art assembly shown in FIGS. 3a-3c, except that the hook assemblies 12 of the present invention include beads 9. As shown in FIGS. 3d and 3f, obstruction 5 cannot get into notch 10 because bead 9 is disposed therein. As shown in FIGS. 3e and 3g, obstruction 5 simply rolls away from or off of bead 9.

Figure 4A:
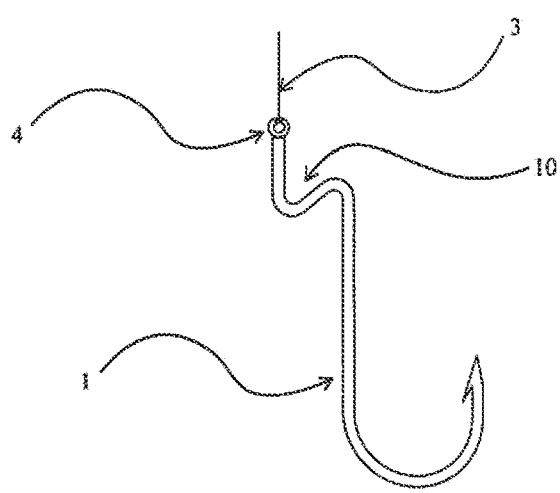

FIG. 4c discloses hook assembly 12 of the present invention including bend 8 as the intermediary object 16. Hook assembly 12 is similar to the prior art assemblies shown in FIGS. 4a and 4b, except that hook assembly 12 of the present invention includes bead 9. Obstruction 5 cannot get snagged in notch 10 and simply rolls off of bead 9. Bead 9 is at or above eye level 14, as explained in more detail below with reference to FIG. 5.

Figure 5:
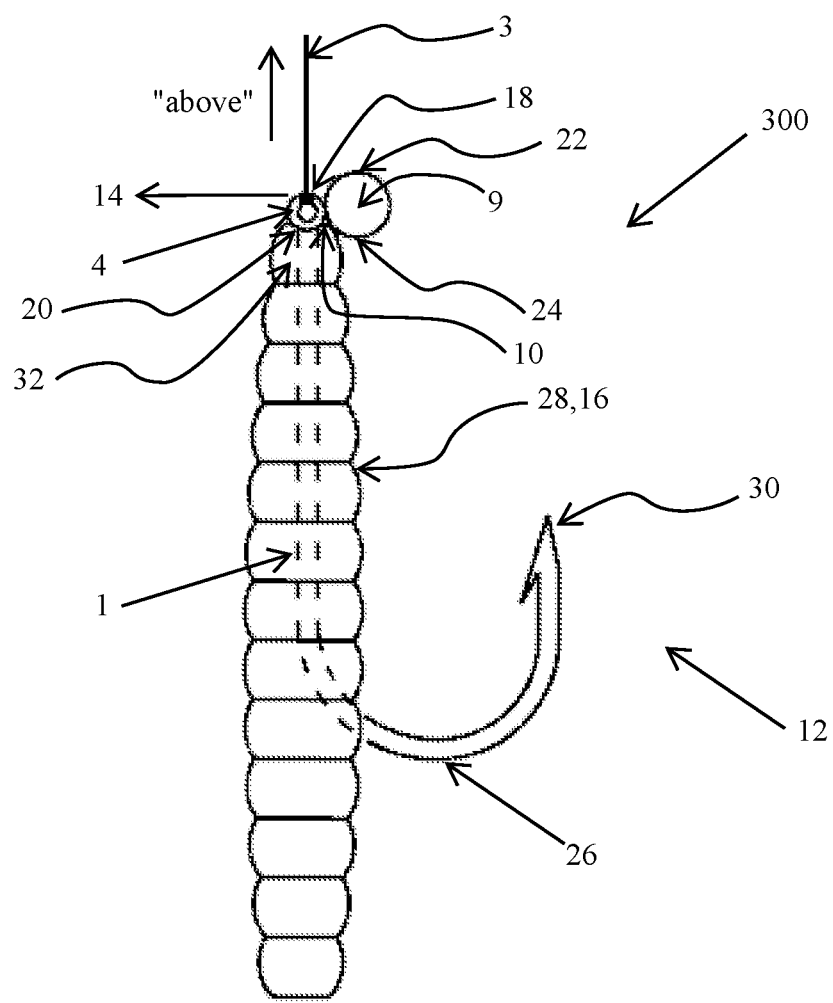
FIG. 5 is a side view of a fish hook assembly of the present invention.

Now referring to FIG. 5, a side view of hook assembly 12 where the intermediate object 16 is fish attractor component 28 is provided. Although fish attractor component 28 is shown as a rubber worm, it is understood that this component 28 may take many forms, such as a shiny or shining object or a small fake fish, and each of these forms is contemplated as being within the scope of the present invention. Eye 4 of hook assembly 12 is at eye level 14. Bead 9 is preferably disposed in notch 10 so that at least top 22 of bead 9 is at or above eye level 14. Bottom 20 of eye 4 is the point on eye 4 that is closest to eye end 32 of hook 1. For many hook assemblies 12, such as the one shown, this will be the intersection of eye 4 and eye end 32 of hook 1. Top 18 of eye 4 is the point on eye 4 that is farthest away from bottom 20 of eye 4. If there were a plane perpendicular to the shank of hook 1 (where the shank is straight, as shown), then eye level 14 would be a parallel plane to that plane, where eye level 14 intersects top 18 of eye 4. Bottom 26 of hook 1 is the point on hook 1 farthest away from eye 4. Bottom 24 of bead 4 is the point on bead 4 closest to bottom 26 of hook 1. Top 22 of bead 9 is the point on bead 9 farthest away from bottom 24 of bead 9. Top 22 of bead 9 is preferably at or above eye level 14. In this context, "above" means in the direction of fishing line 3 if fishing line 3 were threaded through eye 4 and hook assembly 12 were dangling from fishing line 3 in air. FIG. 5 also shows kit 300 of the present invention in its most basic form. Kit 300 includes hook assembly 12 and fishing line 3 that is of a size that can fit through eye 4. A fishing pole (not shown) may also be included in kit 300.

Figure 6:
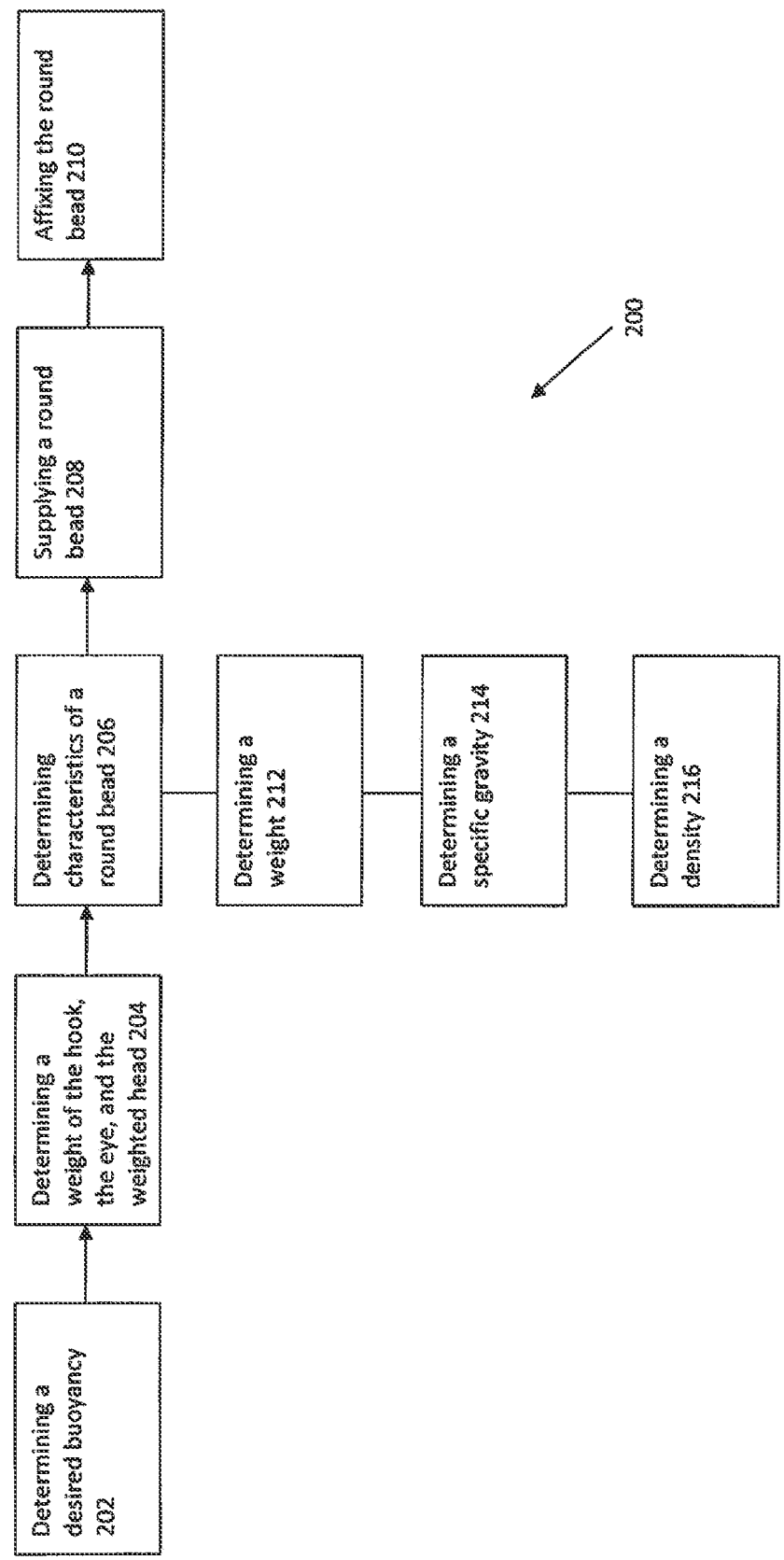
FIG. 6 is a flow chart illustrating the steps of the method of the present invention.

Now referring to FIG. 6, a flow chart illustrating the steps of method 200 of the present invention is provided. Method 200 for preparing to fish includes the following steps: determining a desired buoyancy 202 of a fish hook assembly, where the fish hook assembly is any of the present invention, notably including a bead for affixation in the notch; determining a weight 204 of the hook, the eye, and the weighted head of the fishing hook assembly; determining characteristics of a round bead 206 that will effect the desired buoyancy when affixed to the notch; supplying a round bead 208 with the characteristics determined in step 206; and affixing the round bead 210 supplied in step 208 to the notch of the fishing hook assembly. The step of determining characteristics of the round bead 206 may include any or all of determining the weight 212, specific gravity 214, and/or density 216 of the bead.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:
1. A fish hook assembly consisting of:
a hook with a hook end and an eye end;
an eye disposed proximate to said eye end of said hook;
a weighted head both disposed at said eye end of said hook and attached to said eye such that a notch is formed between said weighted head and said eye; and
a spherical bead disposed only in said notch such that said spherical bead contacts only said eye and said weighted head, wherein:
said weighted head has a hemispherical shape;

said eye end of said hook is attached to a flat portion of said hemispherical shape; and said spherical bead is attached to a round portion of said hemispherical shape.

2. The hook assembly as claimed in claim 1, wherein said bead is hollow.

3. The hook assembly as claimed in claim 2, wherein said bead is filled with a light gas.

4. A fish hook assembly kit, comprising:

a fish hook assembly consisting of:

a hook with a hook end and an eye end;

an eye disposed proximate to said eye end of said hook;

a weighted head both disposed at said eye end of said hook and attached to said eye such that a notch is formed between said weighted head and said eye; and a spherical bead disposed in said notch such that said spherical bead contacts only said eye and said weighted head, wherein:

said weighted head has a hemispherical shape;

said eye end of said hook is attached to a flat portion of said hemispherical shape; and said spherical bead is attached to a round portion of said hemispherical shape; and fishing line sized to fit through said eye of said fish hook assembly.

5. The fish hook assembly kit as claimed in claim 4, further comprising a fishing pole.

6. The fish hook assembly kit as claimed in claim 4, wherein said bead of said fish hook assembly is hollow.

7. The fish hook assembly kit as claimed in claim 6, wherein said bead of said fish hook assembly is filled with a light gas.

* * * * *